Sept. 1, 1931.        P. W. DIETER        1,821,294
PIPE ANCHOR AND CLAMP
Filed Nov. 6, 1929
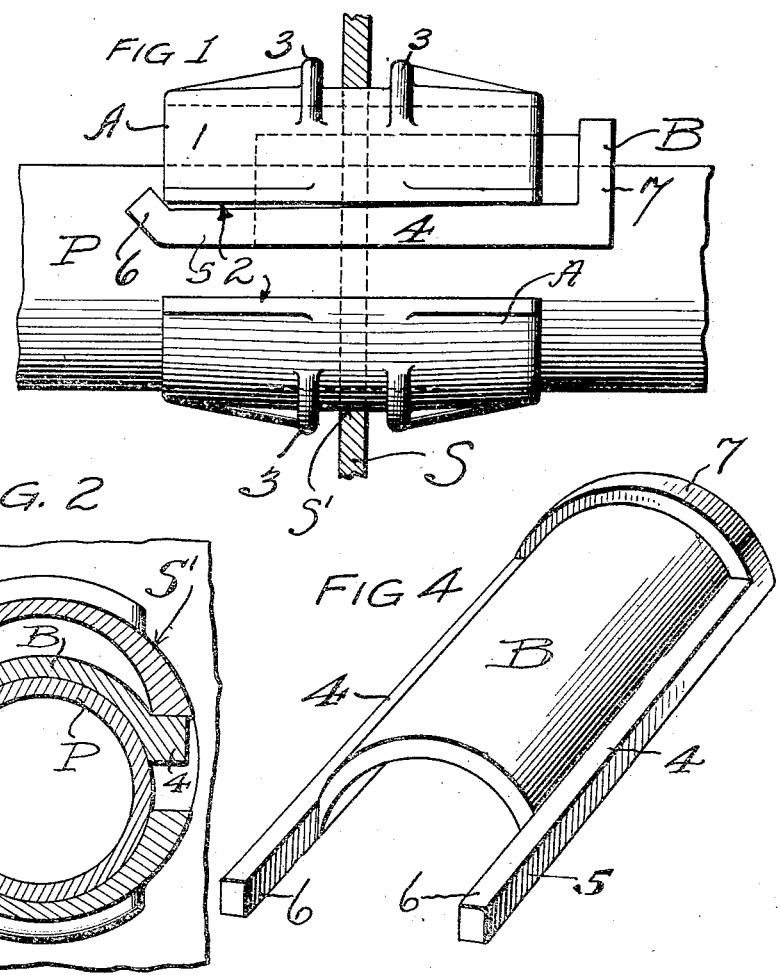
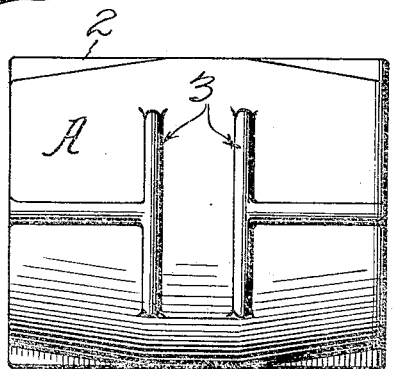
Inventor
Paul W. Dieter,
By
his Attorney Patented Sept. 1, 1931

1,821,294

UNITED STATES PATENT OFFICE

PAUL W. DIETER, OF NEW YORK, N. Y.

PIPE ANCHOR AND CLAMP

Application filed November 6, 1929. Serial No. 405,248.

This invention relates to devices for anchoring and locking pipes, such for example as air and steam pipes to the frame parts of railway cars and the like.

Although the present invention is susceptible of more or less general application in its adaptation to locking or anchoring pipes to a support, nevertheless it is of special utility in connection with the air and steam pipe equipment of railway rolling stock where such pipes are subjected to more or less vibration which it is desirable to eliminate in a simple and practical manner. In that connection the invention contemplates a device of the character set forth which includes a minimum number of parts and which may be placed in position without the use of screws, rivets, bolts or other fastenings which are not only objectionable from a maintenance standpoint but also involve added cost both of production and installation.

Accordingly, the present invention has primarily in view the provision of a pipe anchoring and clamping device which consists of only three parts, two of which may be made from the same pattern or die and are therefore interchangeable, thus not only simplifying the manufacture of the device but also facilitating application in use.

A further object of the invention is to provide an anchor and clamp which provides an extended bearing area between the locking element and the parts to be locked, thereby materially reducing the possibility of breakage or loosening of the parts due to the concentration or focusing of vibration of the pipe or the like to a relatively restricted zone or supporting part.

With the above and other objects in view which will more readily appear as the nature of the invention is better understood, the same consists in the novel construction, combination, and arrangement of parts, hereinafter more fully described, illustrated and claimed.

A preferred and practical embodiment of the invention is shown in the accompanying drawings, in which:

Fig. 1 is a side elevation of the improved anchor and clamp applied in position.

Fig. 2 is a vertical cross sectional view taken on the line 2—2 of Fig. 1.

Fig. 3 is a plan view of one of the anchoring members or shoes.

Fig. 4 is a perspective view of the locking wedge.

Similar reference characters designate corresponding parts throughout the several figures of the drawings.

According to the embodiment of the invention shown in the accompanying drawings the same includes in its organization a pair of anchoring members or shoes A which may be of the same general type or design, and as a matter of fact, are preferably duplicates thereby being interchangeable, reversible end for end, and cooperating with a sliding clamping wedge B to lock the pipe in its support. In the drawings the pipe or other element to be supported is designated generally as P while the support is designated as S and is provided with an opening S' through which the pipe passes. It will of course be understood that while the support is illustrated as having an opening or hole S' therein through which the pipe passes, nevertheless the anchoring shoes A are adapted to cooperate with any oppositely located rigid parts whether they be the sides of an opening or spaced apart frame members.

Referring to the anchoring members or shoes A it will be observed that the same preferably consist of a transversely arched or curved body 1 having the side edge portions 2 and the spaced lug portions 3 on the outer sides thereof adapted to straddle the support S when in position to thereby prevent longitudinal shifting of the pipe P.

The sliding clamping wedge B is also preferably of transversely arched cross section and is provided at the sides thereof with the wedging flanges 4 which may project beyond the end of the body as indicated at 5 to provide bendable locking tongues 6. The end of the sliding wedge member B opposite the locking tongues 6 is preferably provided with a head 7 to facilitate its application by the use of a hammer or mallet.

As will be observed from Figure 1 the device is applied in position by resting the pipe P in one of the anchoring members A. The other anchoring member is then fitted through the opening in the support and the sliding clamping wedge is inserted between the pipe and one of the anchoring members A so that the wedging flanges 4 will engage with the edges 2 of the upper member A and force the same upwardly thereby pushing the entire upper member into binding engagement with the support.

A distinctive feature of the invention resides in placing the sliding clamping wedge element B in direct contact with the pipe, thereby not only forcing the anchoring members or shoes A—A in opposite directions, but also providing a broad bearing engagement between the wedge and the pipe to provide an extended frictional bearing contact between the pipe and the anchoring means which has the advantage of providing a firmer grip on the pipe and at the same time distributing the gripping effect over a greater area. Another advantage of providing the anchoring members A—A with the wedging element B located between the pipe and one of the anchoring members is to permit of a greater tolerance with respect to the diameter of the opening through which the pipe and the anchoring members pass. That is to say, since the wedging element B has a tendency to expand or force the members A apart, provision is clearly made for not only accommodating pipes of different diameter but also compensating for different diameter openings in the support.

After the device has been applied, that is after the wedge B has been forced into position between the pipe and one of the anchoring shoes, the locking tongues 6 may be bent or forced upwardly so that they will engage with the end of the anchoring member thereby preventing accidental withdrawal of the wedge and insuring the entire assembly remaining locked until it is desired to dismantle or remove the particular installation whereupon the bendable tongues may be bent out into their original flat planes and the wedge knocked out.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. A device of the class described adapted for use with a pipe which passes through a support, including, a pair of anchor members adapted to engage with the support, and a locking wedge member having laterally projecting side flanges, said wedge member having a bearing engagement throughout its underside with the pipe, and inclined bearing faces on the upper sides of the bearing flanges adapted to engage with the edge portions of the adjacent anchoring member.

2. A device of the class described adapted for use with a pipe which passes through a support including, a pair of anchor members adapted to engage with the support, and a locking wedge device adapted to be inserted between the pipe and one of the anchor members, said locking wedge member including a body having laterally projecting side flanges adapted to lie between the anchor members, and the upper side faces of said flanges being tapered for engagement with the adjacent edges of the anchor member in proximity thereto, and a bendable locking tongue formed at the end of a side flange whereby the same may be bent upwardly into engagement with the end of the adjacent anchor member.

In testimony whereof I hereunto affix my signature.

PAUL W. DIETER.